(12) United States Patent
Song

(10) Patent No.: US 10,599,012 B2
(45) Date of Patent: Mar. 24, 2020

(54) LIGHT STRUCTURE FOR AN ELECTRONIC DEVICE

(71) Applicant: Shanghai Xiaoyi Technology Co., Ltd., Shanghai (CN)

(72) Inventor: Ye Song, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 15/853,571

(22) Filed: Dec. 22, 2017

(65) Prior Publication Data

US 2018/0120673 A1 May 3, 2018

Related U.S. Application Data

(63) Continuation of application No. 14/953,406, filed on Nov. 29, 2015, now Pat. No. 9,851,620.

(30) Foreign Application Priority Data

Jan. 15, 2015 (CN) .................... 2015 2 0029353 U

(51) Int. Cl.
| | |
|---|---|
| *G03B 17/06* | (2006.01) |
| *H01H 9/16* | (2006.01) |
| *H01H 13/02* | (2006.01) |
| *G03B 17/08* | (2006.01) |
| *H01H 9/04* | (2006.01) |

(52) U.S. Cl.
CPC ............. *G03B 17/06* (2013.01); *H01H 9/161* (2013.01); *H01H 13/023* (2013.01); *G03B 17/08* (2013.01); *H01H 9/04* (2013.01); *H01H 2231/046* (2013.01)

(58) Field of Classification Search
CPC ...................................... G03B 17/06
See application file for complete search history.

(56) References Cited

U.S. PATENT DOCUMENTS

| | | | | | |
|---|---|---|---|---|---|
| 4,127,155 | A | * | 11/1978 | Hydorn | ..................... A45C 3/04 383/106 |
| 5,797,683 | A | * | 8/1998 | Gunzi | ..................... A45C 11/22 383/68 |
| 8,399,764 | B2 | * | 3/2013 | Klosky | ................ H04B 1/3888 174/350 |
| 2007/0252305 | A1 | * | 11/2007 | Kuo | ..................... B29C 37/0082 264/255 |

OTHER PUBLICATIONS

Xbox 360 Console Bundle—Amazon https://www.amazon.com/Microsoft-Xbox-360-Elite-Console-Bundle/dp/B000PD0HQE/ref=sr_1_4?s=videogames&ie=UTF8&qid=1528554799&sr=1-4&keywords=xbox+360.*

(Continued)

*Primary Examiner* — Clayton E. LaBalle
*Assistant Examiner* — Dennis Hancock
(74) *Attorney, Agent, or Firm* — Cantor Colburn LLP

(57) ABSTRACT

A light structure for an electronic device includes a first portion permitting user access to a button of the device; and a second portion surrounding the first portion, wherein the second portion permits light from a light source to pass through. The light passing through the second portion varies according to a condition of the electronic device.

11 Claims, 6 Drawing Sheets

(56) References Cited

OTHER PUBLICATIONS

Xbox 360 Technical Problems—https://en.wikipedia.org/wiki/Xbox_360_technical_problems.*
Sudroid—Generic Silicone Gel Controller Skins for Microsoft Xbox 360 Rubber Cover Case—https://www.amazon.com/Generic-Silicone-Controller-Microsoft-Rubber/dp/B00MWOJ47W/ref=sr_1_22?ie=UTF8&qid=1528562878&sr=8-22&keywords=waterproof+%22xbox+360%22+case.*
Microsoft Xbox 360 Kinect Sensor—https://www.amazon.com/Microsoft-360-Kinect-Sensor-Certified-Refurbished/dp/B005GA1H4C/ref=sr_1_3?ie=UTF8&qid=1528565929&sr=8-3&keywords=kinect.*
"How to Take Apart Your XBox 360" https://www.youtube.com/watch?v=hPuf8KXAK88 (Year: 2010).*
"How to use your wireless Xbox 360 controller without back!" https://www.youtube.com/watch?v=d-bmjykz5uk (Year: 2013).*

* cited by examiner

LIGHT STRUCTURE FOR AN ELECTRONIC DEVICE

CROSS REFERENCE TO RELATED APPLICATION

This application is a continuation of U.S. patent application Ser. No. 14/953,406, filed Nov. 29, 2015, which is based on and claims priority to Chinese Patent Application No. 201520029353.4, filed on Jan. 15, 2015, the entire contents of all of which are expressly incorporated herein by reference to their entirety.

I. TECHNICAL FIELD

The present disclosure generally relates to the field of light guiding technology and, more particularly, to a light structure for an electronic device.

II. BACKGROUND

Electronic devices including cameras, cell phones, tablets, and wearable devices often have one or more casing or housing in which various components are installed. Some of the components, for example, batteries, chips, SIM cards, and circuit modules, may not be visible from outside. Similarly, the manner in which the different components are assembled and set up, and the mode in which a certain component is operating, may not be easily discerned by the user, even for a professional or device maker.

For example, cameras have become a widely used electronic device. Various models of cameras are available with creative features and designs added and updated to suit the needs of different consumer groups. For example, point-and-shoot cameras, designed for simple operation, are especially intended for amateurs with limited photography experience, and who do not require high performance or capabilities of the device. For another example, action cameras, sometimes called sport cameras, may be used to record fast-speed actions.

However, a potential problem with these devices is that while the device buttons allow a user to access and control the device, independent status indicating structures may be needed to display or indicate the operation condition of the device. It may be difficult to provide such features when development of the device itself restricts the size of the device, and features and designs of the casing, or the device may be required to operate in adverse conditions, such as underwater where monitoring of the device operation should be simplified. With increasing features and modes of operation, users may find it very confusing when faced with multiple buttons and indicators on a device.

For example, this may be a problem in the action camera industry. Action cameras are often required to be light weight and small in size to enable easy carrying and attachment, and may be used in adverse conditions, such as underwater where operation of the camera is monitored. Design of the buttons and operation condition indicators, like all other features, needs to be highly efficient, space saving, and preferably multi-functional. Moreover, as action cameras may often be used in high-speed sports in unusual environments such as high-altitude or underwater, there may be requirements of the physical properties of the materials used. The buttons may also require additional protection to improve durability and prevent unintentional access.

SUMMARY

Consistent with embodiments of the present disclosure, there is provided a light structure for a camera, which comprises a first portion permitting user access to a button of the camera, and a second portion surrounding the first portion, wherein the second portion permits light from a light source to pass through.

Consistent with embodiments of the present disclosure, there is also provided a light structure for an electronic device. The light structure includes a first portion permitting user access to a button of the electronic device; and a second portion surrounding the first portion, wherein the second portion permits light from a light source to pass through. The light passing through the second portion varies according to a condition of the electronic device.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
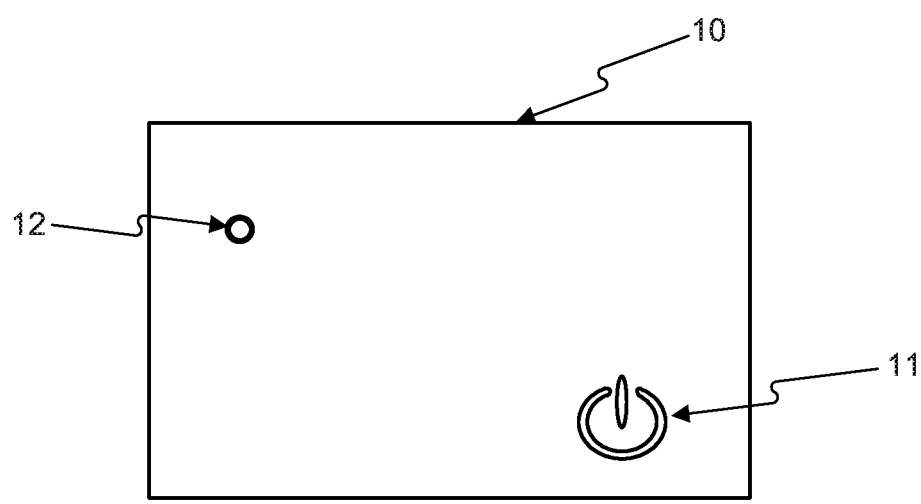
FIG. 1 illustrates a status indicating structure used in existing technology.

The following detailed description refers to the accompanying drawings. While several illustrative embodiments are described herein, modifications, adaptations and other implementations are possible. For example, substitutions, additions or modifications may be made to the components illustrated in the drawings. Accordingly, the following detailed description is not limited to the disclosed embodiments and examples. Instead, the proper scope is defined by the appended claims.

Consistent with the disclosure herein, there is provided a light structure for devices which provides a multi-functional structure within a smaller periphery compared to existing technology. As described in further detail below, the light structure disclosed herein may include a first portion permitting user access to and control of a device, for example, a button; and a second portion surrounding the first portion, the second portion emitting light or allowing light from a light source to pass through.

Electronic devices may have one or more buttons on the casing/housing by which a user may control the operation modes and conditions, such as a power switch, an operation modes switch, volume/speed adjustment, etc. For instance, cameras may have buttons that further control adjustment of lenses, flash operation, etc. Some devices may also use a separate light-transmitting structure in the form of, for example, a status slot (shape may vary), an indicator light (for example, LED technology), to indicate the operation mode or working condition of the device. Some devices may also have a screen which displays modes of operation of the device, battery power level, working conditions of certain components, etc.

The light structure disclosed herein may be used in combination with the above device buttons and/or status indicating structures. For example, the light structure may be installed on a device casing wherein the first portion contains/surrounds a device button. The device button may be in the form of a press button or a touch button on a flat housing surface. The button, the first portion and the second portion may be of different shapes or patterns. The light source may be, for example, an LED unit placed inside the device casing, or alternatively within the light structure. The light structure may further include a base member with a patterned surface that unifies light distribution. The exterior surface of the second portion may extend from the surface of the first portion such that unintentional access to the device button can be restricted. In one aspect, the second portion merely permits light to pass through so the user of the device may be able to tell where the button is located. Alternatively, the light passing through the second portion of the light structure may be associated with a certain figure of merit related to the operation of the device, such that the brightness, pattern, or color effects of the structure may represent a change of that figure. The user may discern the working conditions of the device by the visual effects presented by the light structure.

Consistent with embodiments of the present disclosure, the casing on which the light structure is located may be the outer layer of the electronic device that encloses the various components. Alternatively, the casing on which the light structure is located may be a cover separate from the electronic device but can be easily installed on the electronic device, such as a waterproof protective case that may be separately purchased and installed by a consumer.

FIG. 1 shows a device 10 including an exemplary button and a status indicating structure used in existing technology. More particularly, device 10 includes a power button 11 and a status indicator 12 in the form of a mini-size light. If the indicator light 12 is on, it may indicate the device is working, while the indicator light 12 being off may indicate the device is powered off.

Figure 2:
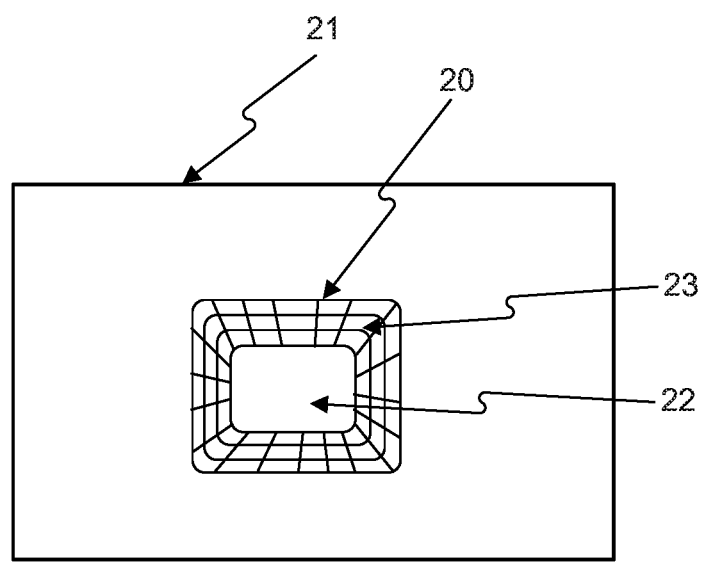
FIG. 2 illustrates a plan view of an exemplary light structure embodiment, consistent with the present disclosure.
Figure 3A:
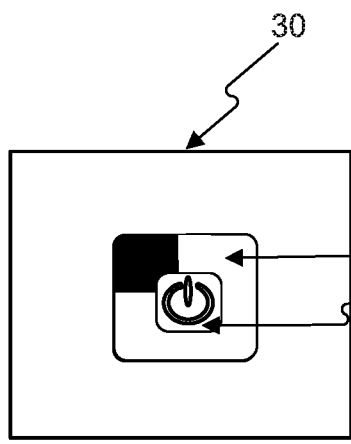
FIGS. 3A-3D illustrate an exemplary light structure embodiment indicating the battery power level of a device.
Figure 3B:
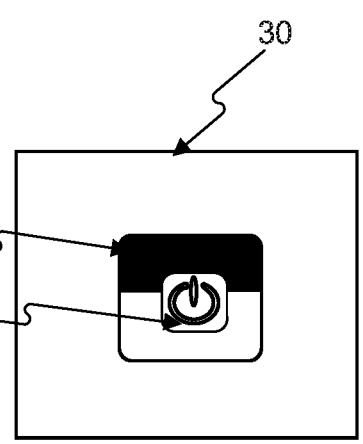
Figure 3C:
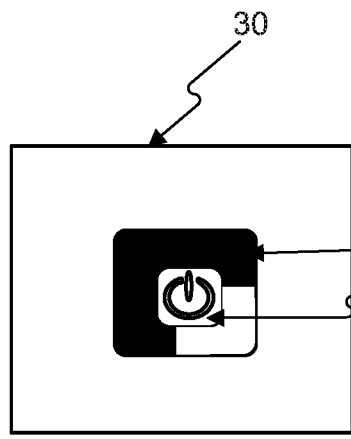
Figure 3D:
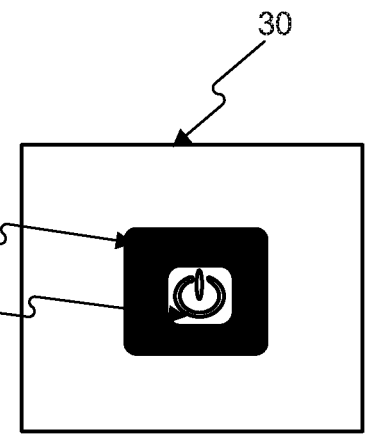

FIG. 2 provides a plan view of an exemplary embodiment of a light structure 20 on a device 21. The light structure includes a first portion 22 and a second portion 23. The first portion 22 permits user access to a device button, while the second portion 23 allows light to pass through. The first portion 22, the second portion 23, and the device button, may be in various forms and shapes, for example, slots, squares, circles, or triangles, to suit the overall design of the device. For example, the second portion 23 may be formed in a ring pattern surrounding the first portion 22. The exterior surface of the device button may also contain a certain pictorial design, for example, a company logo. The device button may control the power of the device, or an amount of merit related to the operation of the device, for example, mode of operation, battery power level, volume, brightness, power, time of operation, or speed. In the embodiment shown in FIG. 2, a power switch button is used as an example.

The second portion 23 contains material that allows light to pass through. More particularly, the second portion 23 is translucent, and may be made of one or more of various types of materials, such as plastics, glass composites, etc. The light structure, or part of it, may be permanently secured onto a casing of device 21, or detachable. The first portion 22 and the second portion 23 may be permanently secured onto each other or detachable from each other. In one aspect, corresponding to a real-time operation condition of the device 21, light passing through the second portion 23 may be set to display various patterns. Such operation conditions may include a battery level, mode of operation, power on/off, duration of operation, temperature, memory space, brightness, volume or speed. For example, the amount of light passing through the second portion 23 may correspond to the battery power level of the device 21, while the color of the light passing through the second portion 23 may represent different modes of operation of the device 21.

FIGS. 3A-3D illustrate an embodiment of a device 30 including a light structure having a first portion 31 and a second portion 32. In the light structure, the size of the illuminated area of the second portion 32 may correspond to the battery power level of the device 30. For example, FIGS. 3A-3D respectively may represent the battery level of the device 30 at 25%, 50%, 75% or charged in full. Alternatively, the brightness of the light coming out of second portion 32 may indicate the level of battery charge.

As for manufacturing the light structure, various molding techniques may be used, for example, double injection molding, which is also called dual-injection molding. Advanced molding technology allows a manufacturer to combine different materials, which may possess different physical and functional characteristics, and to efficiently produce light structures in large quantities. For example, a typical two-shot plastic injection molding process may include using a machine with two independent injection units, each one of which injects a different material into a two-cavity mold.

Figure 4:
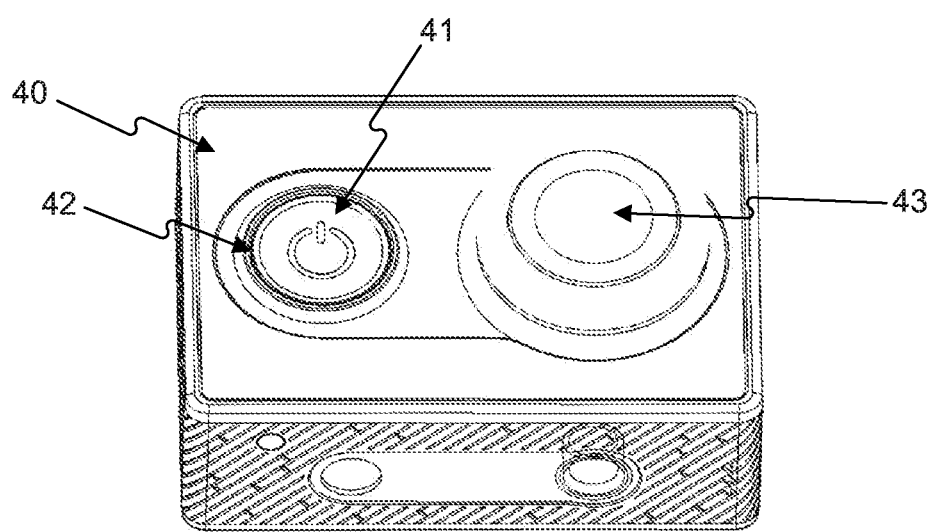
FIG. 4 illustrates an exemplary light structure embodiment installed on a camera.

FIG. 4 illustrates an exemplary embodiment of the light structure installed on a camera casing 40. The light structure includes a first portion 41 which includes a power switch button, and a second portion 42 surrounding the first portion 41. The camera casing 40 also includes a camera lens 43.

In the embodiment illustrated in FIG. 4, the first portion 41 permits access to the camera button which controls the power on and off of the camera. The second portion 42 surrounds the first portion 41 and allows light from a light source to pass through, where the light source may be placed inside the camera or within the light structure.

In one aspect, light passing through and coming out of the second portion 42 indicates to the user the location of the button.

In another aspect, the amount, pattern, or color of light passing through the second portion 42, may indicate an amount of merit related to the operation of the camera. For example, light passing through the second portion 42 may indicate to the user that the camera is currently working, while no light passing through may indicate the camera is switched off. Alternatively, light passing through the second portion 42 may indicate the camera is working in video mode, while no light passing through may indicate the camera is working in photo mode. The color, pattern, or the amount of the light passing through the second portion 42, or the combination thereof, may indicate to the user different operation conditions of the camera. Furthermore, the light structure may be waterproof, or made of a specific type of material consistent with the overall design or manufacturing of the camera. The first portion 41 and the second portion 42 may be permanently secured onto each other, or the camera casing 40, or removable from each other, or from the camera casing 40.

The light structure may be located on a separate protective case that a consumer may purchase and install on an electronic device (such as camera). In some aspects of the present disclosure, where a light source is built in the case and light passing through the second portion of the light structure indicates certain work conditions of the device to the user, the separate protective case may include an interface that, when the case is installed, communicates with the device to obtain necessary information of the work conditions such that the light coming out of the second portion is adjusted accordingly.

Further, the light structure disclosed herein may be used on sports cameras, also called action cameras, which are designed for filming actions particularly in modern sports and may allow fast and continuous capture of the actions. These cameras may be used for outdoor sports, where the device may be attached to helmets, handlebars, surfboards wrists or other body parts of the player to record the actions. Action cameras are typically compact, light-weight, and small sized. Some models have a waterproof surface or casing. The light structure can provide a multi-functional camera component which indicates the operation conditions of the camera, eliminates the need for status indicating structures independent of and separate from the device buttons, improves compactness of the camera, protects the buttons and avoids unintentional access, and provides more uniform light distribution. The light structure can be made waterproof to suit the needs of underwater usage.

Figure 5:
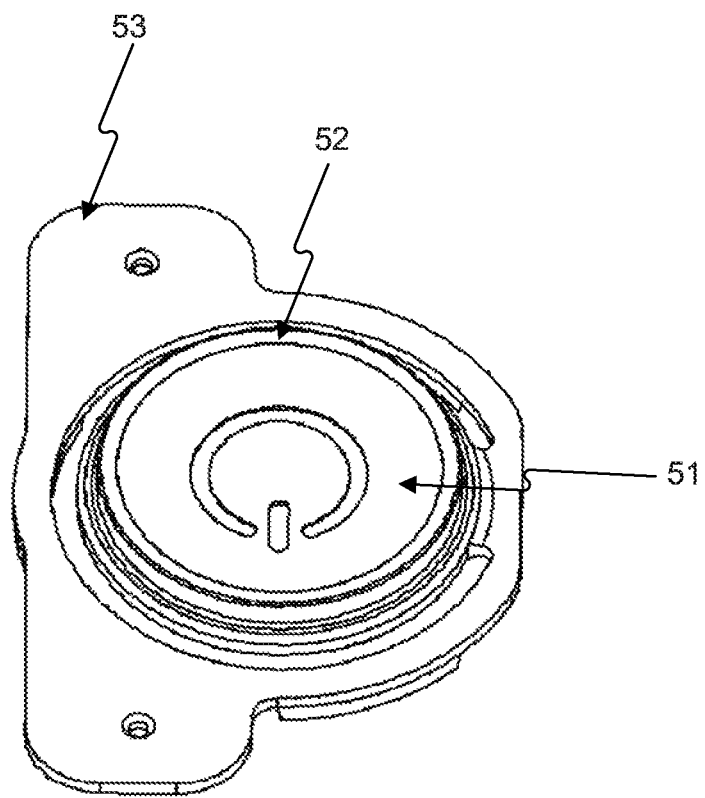
FIG. 5 illustrates an exemplary architecture of the light structure embodiment, wherein the light structure further includes a base member.

FIG. 5 illustrates an exemplary architecture of a light structure embodiment. In the exemplary architecture illustrated in FIG. 5, an exterior surface of a second portion 52 may extend from that of a first portion 51, such that access to the first portion 51 and a button therein may be protected, avoiding unintentional contact. As the second portion 52 may prevent switching on or operating the device unintentionally, durability of the button itself and the device can be improved. In one aspect, the exterior surface of the second portion 52 may extend from the surface of a device casing where the light structure is located on. Further, the exterior surface of the second portion 52 may extend from that of a base member 53, such that protection of the button can be achieved while providing a more aesthetic outward appearance of the device.

As illustrated in FIG. 5, the light structure further includes the base member 53. The base member 53 may be permanently secured to the first portion 51, the second portion 52 or both. At least part of the base member 53 contains a material capable of transmitting light. Light emitted from a light source may first pass through the base member 53 then through the second portion 52. The base member 53 may be of different shapes to suit the needs of the overall design, or to facilitate manufacturing or assembly. For example, the base member 53 may include one or more wings with cavities or apertures designed for easy attachment to a casing or other device components. Part of the base member 53 may be thicker than the other parts.

Figure 6:
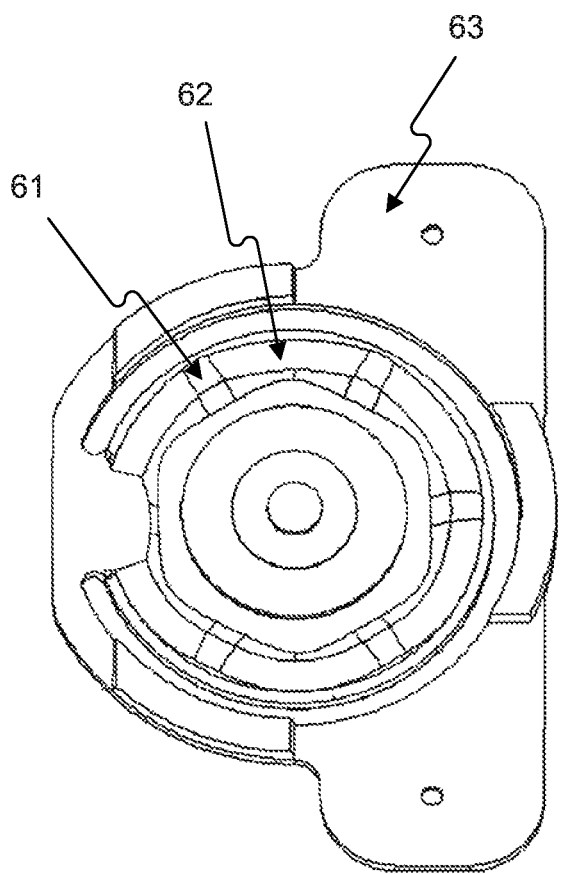
FIG. 6 illustrates a bottom view of an exemplary embodiment of a light structure.

FIG. 6 illustrates a bottom view of an exemplary embodiment of a light structure consistent with the present disclosure. The bottom surface of a base member 61 may contain a certain pattern. As shown in FIG. 6, the bottom surface of the base member 63 includes a plurality of raised areas 61 and depressed areas 62. The raised areas 61 and the depressed areas 62 may connect with each other and form a ring pattern. The pattern may be designed or arranged for the purpose of better light penetration or uniform light distribution. The design may also help create various brightness, color patterns or other visual effects, so as to indicate corresponding working conditions of the device. For example, the change in the amount of light that passes through may indicate a corresponding change in battery power level. The user may obtain information related to the operation of the device, by the visual effects displayed through the light structure.

Consistent with embodiments of this disclosure, the light structure may be used on various other devices, including electronic devices such as cellphones, desktops, laptops, tablets, wearable devices, top-boxes, and multi-media players; and industrial or research appliances such as deep sea exploration equipment. Functional advantages of a light structure consistent with the present disclosure may include, indicating the operation conditions of the device, eliminating the need of status indicating structures independent of and separate from the device buttons, improving compactness of the device, protecting the buttons and avoiding unintentional access, and providing more uniform light distribution. The light structure also adds aesthetic value to the overall device design.

Consistent with embodiments of this disclosure, the light structure may include a first portion permitting user access to a button of an electronic device, and a second portion surrounding the first portion, wherein the second portion permits light from a light source to pass through. In one aspect, the electronic device is a camera. In another aspect, an amount of light passing through the second portion varies. In another aspect, the amount of light passing through the second portion varies in accordance with a power level of the electronic device. The button may control modes of operation of the camera.

While illustrative embodiments have been described herein, the scope of any and all embodiments having equivalent elements, modifications, omissions, combinations (e.g., of aspects across various embodiments), adaptations and/or alterations would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. It is intended, therefore, that the specification and examples be considered as illustrative only, with a true scope and spirit being indicated by the following claims and their full scope of equivalents.

What is claimed is:

1. An electronic device, comprising:
   a button for controlling the electronic device;
   a light source for generating light;
   a first portion permitting user access to the button;
   a second portion surrounding the first portion, wherein the second portion permits the light from the light source to pass through, the light passing through the second portion varying in at least a degree of brightness according to a condition of the electronic device; and
   a base member attached to at least one of the first portion and the second portion, wherein a bottom surface of the base member includes a plurality of raised areas and depressed areas permitting the light to pass through;
   wherein the light emitted from the light source first pass through the plurality of raised areas and depressed areas then through the second portion, and the bottom surface of the base member faces in an opposite direction of a surface permitting user access of the button; and
   wherein an exterior surface of the second portion extends from an exterior surface of the first portion and a casing of the device, and the exterior surface of the second portion is higher than the exterior surface of the first portion and the casing of the device.

2. The device of claim 1, wherein the condition of the electronic device comprises a battery level, mode of operation, power on/off, duration of operation, temperature, memory space, brightness, volume or speed.

3. The device of claim 1, wherein the light passing through the second portion varies in discrete steps.

4. The device of claim 1, wherein the light source is located within the electronic device.

5. The device of claim 1, wherein the second portion includes a ring pattern structure surrounding the first portion.

6. The device of claim 1, wherein at least a part of the electronic device is made by double injection molding.

7. The device of claim 1, wherein the plurality of raised areas and depressed areas connect and form a ring pattern.

8. The device of claim 1, wherein the first and second portions are located in a protective cover installed on the electronic device.

9. The device of claim 8, wherein the protective cover is waterproof.

10. The device of claim 1, wherein the light passing through the second portion varies in at least three sizes of an illuminated area according to the condition of the electronic device.

11. The device of claim 1, wherein the electronic device is a camera.

\* \* \* \* \*